March 7, 1933.    T. A. ROWE    1,900,763
SILO
Filed May 14, 1930
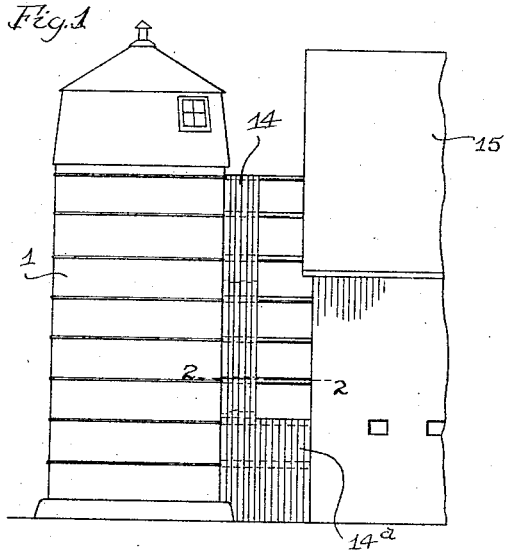
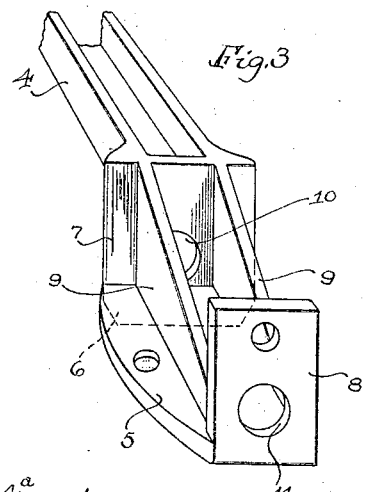
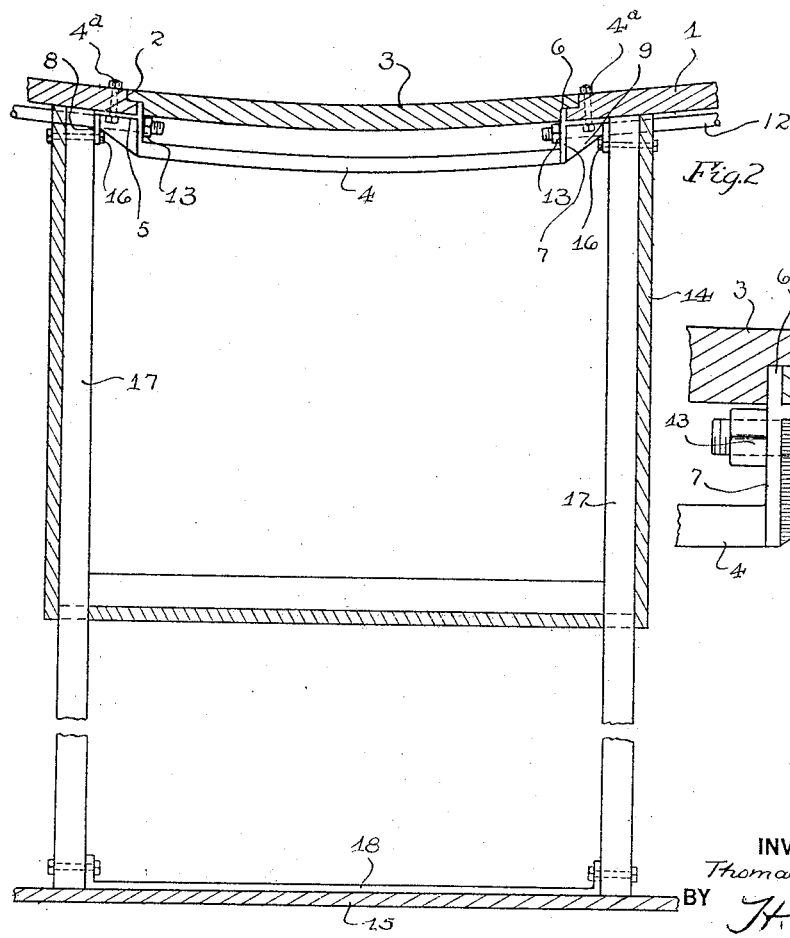
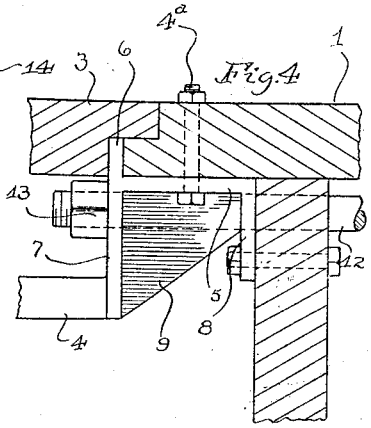
INVENTOR
Thomas A. Rowe
BY
H. H. Simms
his ATTORNEY Patented Mar. 7, 1933

1,900,763

UNITED STATES PATENT OFFICE

THOMAS A. ROWE, OF RED CREEK, NEW YORK

SILO

Application filed May 14, 1930. Serial No. 452,444.

The present invention relates to silos and an object thereof is to provide a construction which will be stronger, more durable and less expensive than those now on the market. Another object of the invention is to provide a novel means of connecting a chute to a silo. Still another object of the invention is to provide a single member which may be used as a door brace, a ladder rung, a tie piece for a tie wire or cable, and an anchorage piece for the chute in a silo.

To these and other ends, the invention consists of certain parts and combinations of parts, all of which will be hereinafter described: the novel features being pointed out in the appended claims.

In the drawing:

Fig. 1 shows in side elevation a silo connected with a barn (shown fragmentarily) by a chute;

Fig. 2 is a section on the line 2—2, Fig. 1;

Fig. 3 is a fragmentary perspective of one end of the brace; and

Fig. 4 is an enlarged section showing the connection of the brace to the barn and to a chute frame piece.

In the illustrated embodiment of the invention 1 indicates a silo having as usual a vertical door opening 2 closed by a plurality of door sections 3 which are held in place in any suitable manner.

Extending across the door openings opening one above the other in substantially equidistant relation are braces of malleable iron or other suitable material which are preferably cast but may be otherwise formed, each of which embodies a central longitudinal portion 4 offset outwardly by end portions each of which has a flat plate portion 5 abutting the outer face of the silo in immediate proximity to the door opening and a flange or rib 6 projecting inwardly from the inner side of the plate portion to cooperate with the side of the door opening. Bolts 4ª pass through openings in the plate portion and secure the brace in position. The plate portion 5 connects with the central portion 4 by a transverse portion 7 and also has at its outer end an outwardly extending transverse portion 8. The portions 7 and 8 are connected by two spaced parallel strengthening ribs 9. The portions 7 and 8 are provided with openings 10 and 11 respectively so as to provide a passageway in the offset end portions opening on the inner face of the central portion 4. The two offset end portions serve as anchoring means for the hoops or bands 12 surrounding the silo, the ends of each hoop being passed through the openings 10 and 11 in opposite ends of the brace and being held in position by nuts 13 arranged on the inner faces of the offset portion of the brace where they may be easily adjusted when the adjacent door section 3 is removed.

The outwardly extending portions 8 at the opposite ends of a brace form abutments or shoulders at right angles to the length of the brace. Through these abutments the brace may serve as an attaching or anchoring means for the silo chute 14 which may extend from the top to the bottom of the silo in front of the door opening. These braces also serve for tying the silo to an adjacent structure such as a barn 15. This result is obtained by securing at 16 one end of the horizontal frame pieces 17 to the opposite ends of the braces and securing the other end of the pieces to the barn 15 through the means of a tie piece 18 which extends between two frame pieces 17 and is secured to the pieces and to the barn. The barn is provided with a door at its lower part between the two sets of frame pieces 17. The portion 14ª of the chute 14 between this door and the silo is entirely closed at its top and opposite sides, whereas, the portion of the chute above this upper part does not extend to the barn but is closed at its top, opposite sides and front. The chute however opens throughout its length to the silo by way of the vertically elongated door opening of the silo.

According to this invention the braces not only secure the hoops but also have means at opposite ends by which the chute may be anchored to the braces and the silo may be connected to a barn so as to hold the silo steady. The hoops or bands connect with the braces in such a manner that their ends lie on the inner faces of the braces where they may be easily reached from the inside of the silo. The braces also serve as steps or rungs by which access to the top of the silo may be obtained. By the use of these braces a strong, sturdy silo and chute construction is obtained.

What I claim as my invention and desire to secure by Letters Patent is:

1. The combination with a silo having a vertical door opening, and a band surrounding the silo, of a brace secured to the silo on opposite sides of the door opening and having passageways through opposite ends thereof terminating on the inner face of the brace through which the ends of the band are passed, and fastening means for the band ends arranged on the inner face of the brace.

2. The combination with a silo having a vertically arranged door opening, independent unitary braces secured at opposite ends to the silo on opposite sides of the door opening, and a chute in front of the door opening secured to the braces.

3. The combination with a silo having a vertically arranged door opening, unitary braces independent of the side walls of the silo secured to the silo on opposite sides of the door opening having abutments at opposite ends, and a chute about the door opening having frame pieces abutting the ends of the braces and secured to the latter.

4. The combination with a silo having a vertical door opening, and bands surrounding the silo, of unitary braces secured at opposite ends to the silo on opposite sides of the door opening and having the ends of the bands secured thereto, and a chute about the door opening having frame pieces secured to the unitary braces.

5. The combination with a silo having a vertical door opening and bands surrounding the silo, of unitary braces secured at opposite ends to the silo on opposite sides of the door opening, and having the ends of the bands connected thereto, a barn, and horizontally extending frame pieces secured to opposite ends of the braces and also to the barn to tie the silo to the barn through the braces and the bands.

6. A unitary brace for silos having means at opposite ends for securing it to opposite sides of the door opening of the silo, and outwardly projecting means at opposite ends for securing a chute thereto.

7. A new article of manufacture comprising a unitary brace for silos, consisting of a longitudinal connecting central portion having outwardly offset end portions, each of which end portions consists of spaced inner and outer oppositely disposed transverse portions which are adapted to receive and anchor the respective ends of a silo band at the said inner transverse portions.

8. A new article of manufacture comprising a brace for silos, consisting of an integral casting having a central longitudinal connecting portion and end portions, each of said end portions consisting of spaced inner and outer oppositely disposed transverse portions with registering openings therein, through which openings the respective ends of a silo band are inserted and anchored at the inner transverse portions.

9. A new article of manufacture comprising a brace for silos, consisting of an integral casting having a central longitudinal connecting portion and end portions, each of said end portions consisting of spaced inner and outer oppositely disposed transverse portions with registering openings therein, the said portions being connected by spaced parallel strengthening ribs on opposite sides of the openings, through which openings the respective ends of a silo band are inserted and anchored at the inner transverse portions.

10. A new article of manufacture comprising a brace for silos having a longitudinal connecting portion and an end portion, the end portion consisting of a flat plate portion and spaced inner and outer oppositely disposed transverse portions with registering openings therein, the said plate and transverse portions being connected by spaced parallel strengthening ribs on opposite sides of the openings, through which openings the end of a silo band is received and anchored at the inner transverse portion.

THOMAS A. ROWE.